United States Patent [19]
Glaeser

[11] 4,422,780
[45] Dec. 27, 1983

[54] TRANSVERSELY RESTRAINED, LONGITUDINALLY FLEXIBLE MOUNT FOR A BEARING FOR A SPINDLE

[76] Inventor: George L. Glaeser, 4258 Mentone Ave., Culver City, Calif. 90230

[21] Appl. No.: 339,719

[22] Filed: Jan. 12, 1982

[51] Int. Cl.$^3$ ............................................. F16C 27/00
[52] U.S. Cl. .................................... 384/215; 384/428; 308/184 R
[58] Field of Search .................... 308/15, 22, 26, 28, 308/184 R, 184 A, 189 R, 189 A, 207 R, 207 A; 384/215, 220, 222, 428, 438; 248/609, 635

[56] References Cited

U.S. PATENT DOCUMENTS

| | | | |
|---|---|---|---|
| 3,113,809 | 12/1963 | Eggman | 308/26 |
| 3,388,880 | 6/1968 | Knight | 308/28 X |
| 3,515,445 | 6/1970 | Stone | 308/26 X |
| 3,909,156 | 9/1975 | Stahl | 308/28 X |

Primary Examiner—Stuart S. Levy
Assistant Examiner—David J. Werner
Attorney, Agent, or Firm—W. Edward Johansen

[57] ABSTRACT

The present invention is a transversely restrained, longitudinally flexible mount for use in mounting a bearing for a spindle in a spindle housing. The transversely restrained, longitudinally flexible mount includes an inner ring which is mechanically coupled to the bearing and an outer ring which is disposed concentrically to the inner ring and which is mechanically coupled to the spindle housing. The transverse restrained, longitudinally flexible mount also includes a frame member having an inner cylindrical band mechanically coupled to the inner ring, an outer cylindrical band mechanically coupled top the outer ring and a plurality of hollow cylindrical spokes extending radially from the axis of the frame member for providing lateral rigidity between the inner and outer cylindrical bands so that the inner and outer cylindrical bands are concentric with each other and the axis of the spindle. The frame member also has a first flexible coupling member and a second flexible coupling member both of which longitudinally flexibly couple the inner cylindrical band to the outer cylindrical band whereby the inner ring is able to bi-directionally move longitudinally along the axis of the spindle. The frame member of the transversely restrained, longitudinally flexible mount is an integral member which is formed by a two step process. The first step is plating with a plating material a platen which is in the shape of the frame member. The second step is dissolving the platen in a selected solution whereby the plating material forms the frame member.

1 Claim, 4 Drawing Figures

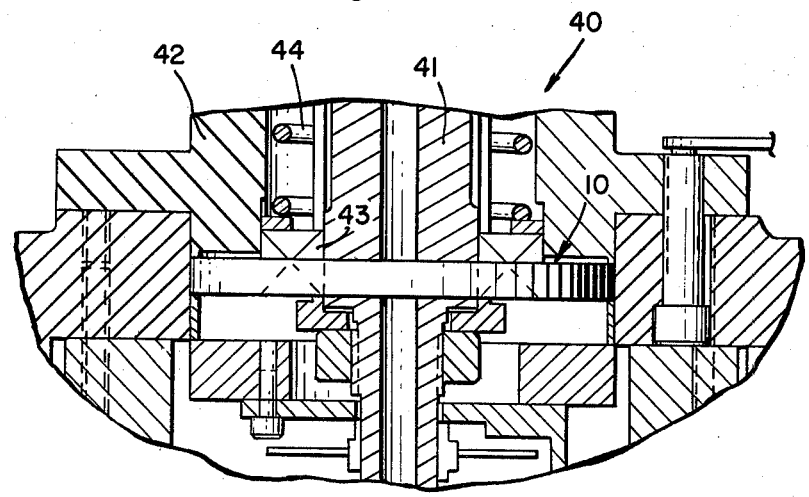
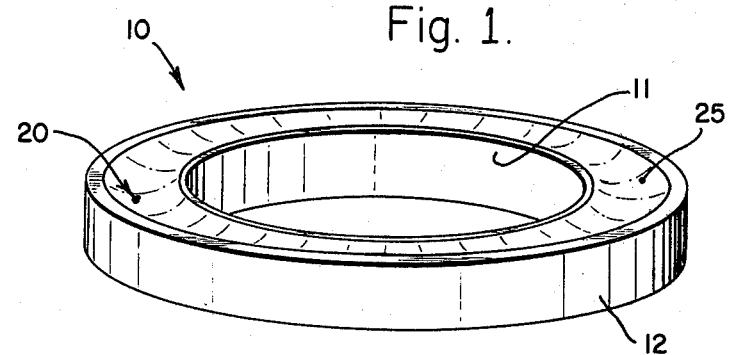
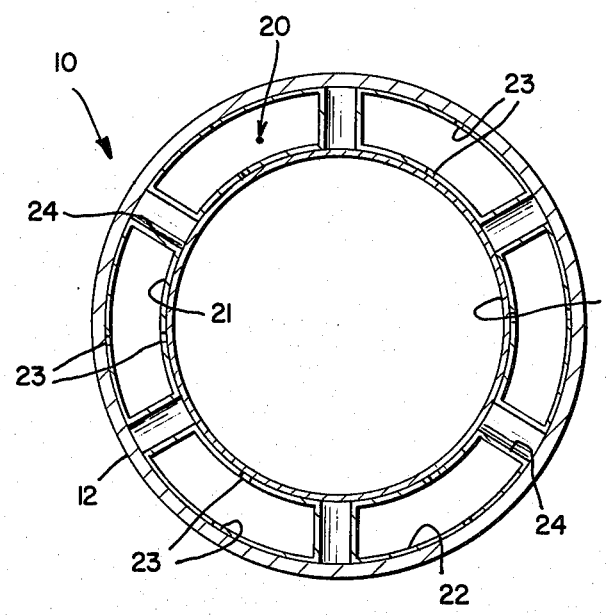
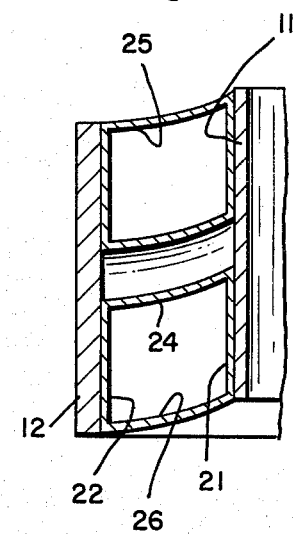

TRANSVERSELY RESTRAINED, LONGITUDINALLY FLEXIBLE MOUNT FOR A BEARING FOR A SPINDLE

BACKGROUND OF THE INVENTION

1. Field of the Invention

The present invention relates to a mount for mounting into a frame a floating bearing for a rotating shaft in order to enable the floating bearing to freely and bidirectionally move longitudinally along the shaft, and more particularly to a mount which restrains the transverse movement of the floating bearing.

2. Description of the Prior Art

In his article, entitled "Right on Target with Winchester," published in *Microcomputing* in July, 1981, on pages 34–41 Martin Moore discusses the use of hard disks as mass storage devices for microprocessors. According to this article there are two predominant ways to rotate a hard disk at 3600 rpm with little or no side to side or up and down movement. One way is to spin the disk with an AC motor driving the disk spindle, which is the center shaft, by means of a belt and pulley apparatus. The second way is make the spindle of the disk into a DC brushless spindle drive motor. The AC motor is less expensive than the DC spindle drive motor, but the DC spindle drive motor can be held to greater speed tolerances. As the DC spindle drive motor is able to better regulate the rotation speed of the disk it is able to reduce the chance of losing data.

U.S. Pat. No. 4,292,656, entitled Enclosed-Type Magnetic Disc Recording and/or Reproducing Apparatus, issued to Masahiko Fujioka on Sept. 29, 1981, teaches an enclosed magnetic disk recording and/or reproducing apparatus having a disk drive which includes a spindle on which a disk is fixedly coupled and an AC motor the shaft of which is mechanically coupled to the spindle by a belt and a pulley.

U.S. Pat. No. 4,295,162, entitled Reading One-Dimensional Line Image Holograms of a Video Track from a Disc with a Guide Track, issued to W. John Carlsen on Oct. 13, 1981, teaches an optical disk drive which includes an optical disk mounted on a spindle, a pulley fixedly coupled to the spindle and a motor the shaft of which is mechanically coupled to the spindle by a belt and a pulley apparatus.

It is necessary to provide a floating bearing for each of the spindles of U.S. Pat. No. 4,295,162 and U.S. Pat. No. 4,292,656 in order to compensate for thermal expansion or contraction of the frames and other components of the disk drives. The use of the belt and pulley apparatus in each of these disk drives restrains the transverse movement of the floating bearing and maintains the axial position of the spindle with such extreme precision that pre-recorded tracks on the disk are concentric with the axis of the spindle within extremely small tolerances.

U.S. Pat. No. 4,205,357, entitled Disk Drive Unit Incorporating a Field-Replaceable Fixed Disk Assembly, issued to Richard E. Barton, Jack V. Fultz, Yoshiyasu Narahara and Michael S. Shebanow on May 27, 1980, teaches a disk assembly which is normally fixed on disk drive, but which can be removed in the field from the disk drive spindle and replaced on the spindle with extreme precision so that pre-recorded tracks are concentric with the axis of the spindle within extremely small tolerances. The disk assembly includes a mounting ring which fits around the spindle. The ring has three resilient centering flextures which extend slightly radially inwardly of the rest of the ring to engage the spindle and all of which are outwardly deflected substantially the same amount to center the ring on the spindle.

U.S. Pat. No. 4,267,477, entitled Electromotor, issued to Fritz Faulhaber on May 12, 1981, teaches an electromotor which includes a hollow elongated housing, a motor shaft mounted in the housing and a magnet surrounding the motor shaft.

U.S. Pat. No. 4,289,989, entitled Brushless Exciter Rotor Mounting, issued to Patrick J. Schibline on Sept. 15, 1981, teaches a brushless exciter rotor mounting of a sleeveless design.

U.S. Pat. No. 4,243,902, entitled Direct Current motor with Non-Supported Armature Windings, issued to Itsuki Ban, Manshu Shiraki and Kazuhito Egami on Jan. 6, 1981, teaches a direct current motor.

U.S. Pat. No. 4,285,018, entitled Disk File, issued to Richard B. Mulvany and Tulsidass R. Patel on Aug. 18, 1981, teaches a disk file for storing data which includes two major separable assemblies, an HDA assembly and a disk drive assembly. The drive assembly includes a motor which is disposed beneath the horizontal shelf portion of the HDA assembly and which may be coupled to drive the spindle of the HDA assembly.

It is also necessary to provide a floating bearing for a spindle of a disk drive when the spindle is also drive shaft of a DC brushless spindle drive motor in order to compensate for thermal expansion or contraction of the frame and other components of the disk drive. There is no belt and pulley apparatus in the disk drive to restrain the transverse movement of the floating bearing and maintain the axial position of the spindle with any extreme precision that that the pre-recorded tracks on the disk are not concentric with the axis of the spindle within acceptable tolerances. There is presently no method of mounting a floating bearing into a frame of a disk drive which incorporates a DC brushless spindle drive motor so that the floating bearing may freely and bidirectionally travel longitudinally along the axis of the spindle, but it may also maintain the axial position of the spindle with such extreme precision that pre-recorded tracks on the disk are concentric with the axis of the spindle within extremely small tolerances.

SUMMARY OF THE INVENTION

In view of the foregoing factors and conditions which are characteristic of the prior art it is the primary object of the present invention to provide a transversely restrained, longitudinally flexible mount for mounting into a frame a floating bearing for a rotating shaft so that the floating bearing is not only able to freely and bidirectionally move longitudinally along the shaft, but also is restrained from any transverse movement of the floating bearing whereby it is able to maintain the axial position of the rotating shaft.

It is another object of the present invention to provide a transversely restrained, longitudinally flexible mount for mounting a floating bearing into a frame of a disk drive incorporating a DC brushless spindle drive motor which can freely and bidirectionally travel longitudinally along the axis of the spindle while still maintaining the axial position of the spindle with extreme precision.

It is still another object of the present invention to provide a transversely restrained, longitudinally flexible mount for bearing for a spindle which the spring force required to longitudinally move it may be controlled by varying the thickness of its flexible members.

In accordance with the present invention an embodiment of a transversely restrained, longitudinally flexible mount for use in mounting a bearing for a spindle in a spindle housing is described. The transversely restrained, longitudinally flexible mount includes an inner ring which is mechanically coupled to the bearing and an outer ring which is disposed concentricly to the the inner ring and which is mechanically coupled to the spindle housing. The transversely restrained, longitudinally flexible mount also includes a frame member having an inner cylindrical band mechanically coupled to the inner ring, an outer cylindrical band mechanically coupled to the outer ring and a plurality of hollow cylindrical spokes extending radially from the axis of the frame member for providing lateral rigidity between the inner and outer cylindrical bands so that the inner and outer cylindrical bands are concentric with each other and the axis of the spindle. The frame member also has a first flexible coupling member and a second flexible coupling member both of which longitudinally flexibly couple the inner cylindrical band to the outer cylindrical band whereby the inner ring is able to bi-directionally move longitudinally along the axis of the spindle. The frame member of the transversely restrained, longitudinally flexible mount is an integral member which is formed by a two step process. The first step is plating with a plating material a platen which is in the shape of the frame member. The second step is dissolving the platen in a selected solution whereby the plating material forms the frame member.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective drawing of a transversely restrained, longitudinally flexible mount which is used for mounting a bearing for a spindle in a spindle housing and which has been constructed in accordance with the principles of the present invention.

FIG. 2 is a plan cross-sectional view of the transversely restrained, longitudinally flexible mount of FIG. 1.

FIG. 3 is a side elevational cross-sectional view a portion of a spindle and a spindle housing of a disk-drive in which the transversely restrained, longitudinally flexible mount of FIG. 1 is mechanically coupled to the spindle housing to a bearing which rotatively couples the spindle to the spindle housing and is longitudinally flexed.

FIG. 4 is a fragmentary, side elevational cross-sectional view of the transversely restrained, longitudinally flexible mount of FIG. 1 having an inner ring, a frame member and an outer ring in which there is relative longitudinal movement between the inner ring and the outer ring.

DESCRIPTION OF THE PREFERRED EMBODIMENT

In order to best understand the present invention it is necessary to refer to the following description of its preferred embodiment in conjunction with the accompanying drawing. Referring to FIG. 1 a transversely restrained, longitudinally flexible mount 10 for use in mounting a bearing for a spindle in a spindle housing. The transversely restrained, longitudinally flexible mount 10 includes an inner ring 11 which may be mechanically coupled to the bearing and an outer ring 12 which is disposed concentricly to the the inner ring 11 and which may be mechanically coupled to the spindle housing.

Referring to FIG. 2 in conjunction with FIG. 1 the transversely restrained, longitudinally flexible mount 10 also includes a frame member 20 which has an inner cylindrical band 21 mechanically coupled to the inner ring 11 and an outer cylindrical band 22 mechanically coupled to the outer ring 12. The frame member 20 also includes a plurality of hollow cylindrical spokes 24 which extend radially from the axis of the frame member 20 and which provide lateral rigidity between the inner and outer cylindrical bands 21 and 22 so that the inner and outer cylindrical bands 21 and 22 are concentric with each other and the axis of the spindle. The frame member 20 also includes a first flexible coupling member 25 and a second flexible coupling member 26 both of which longitudinally flexibly couple the inner cylindrical band 21 to the outer cylindrical band 22 whereby the inner ring 11 is able to bi-directionally move longitudinally along its axis while the outer cylindrical band remains fixed in place.

Referring now to FIG. 3 in conjunction with FIG. 1 and FIG. 2 the frame member 20 of the transversely restrained, longitudinally flexible mount 10 is an integral member which is formed by a two step process which includes the first step of plating with a plating material a platen which is in the shape of the frame member. The two step process includes the second step of dissolving the platen in a selected solution whereby the plating material forms the frame member 20.

U.S. Pat. No. 4,132,607, entitled Process for Forming a Capstan, issued to Alan Painter, Daniel R. O'Neill and George L. Glaeser on Jan. 2, 1979, teaches the method of forming an integral member by the two step process described above. The plating material is a metal such as nickel. The solution is selected so that it will dissolve the platen and not the plating material.

Referring to FIG. 4 a disk drive 40 includes a spindle 41, on which a disk is fixedly mounted so that the spindle 41 is able to rotate the disk, a spindle housing 42 which houses the spindle 41 and in which the spindle 41 rotates, a bearing 43 which rotatively couples the spindle 41 to the spindle housing 42 and a spring 44 for resiliently preloading the bearing 43.

The process of forming the frame member 20 includes the steps of (1) plating a platen with a metallic material which has the same shape as the frame member 20 and (2) dissolving away the platen in a dissolving solution thereby leaving the frame member 20. When the platen is aluminum, an excellent dissolving solution is sodium hydroxide, although any solution may be used that will dissolve the aluminum and will not dissolve the metallic plating material. The inventor has found that a frame member 20 formed from nickel by either an electroless deposition or an electrode deposition is not only durable in structural strength, but also has a longitudinal flexibility which one can control by varying the thickness of the plating material forming the frame member 20. The inventor has also fabricated the frame member 20 from magnesium, titanium and aluminum. Furthermore, by using a platen formed from sand, the design of the frame member 20 allows it to be injection molded out of a plastic material as a one piece, monolithic construction which enhances its structural strength while not limiting its longitudinal flexibility.

The inventor has also separately made the individual elements of the frame member 20 out of both metallic materials and plastic materials. The inventor has also been able to vary the configuration of the first flexible coupling member 25 and the second flexible coupling member 26 along with the thickness of the plating material in order to control the spring force which is necessary to longitudinally move the precision bearing 43. Furthermore the number and distribution of the plurality of hollow cylindrical spokes 24 may be varied to provide different degrees of transverse rigidity between the inner and outer cylindrical bands 21 and 22. The outer race of a precision bearing 43 is fixedly coupled to the inner cylindrical band 21 and the frame 42 of the disk drive 40 is fixedly coupled to the outer cylindrical band 22 whereby the inner ring 11 is able to bi-directionally move longitudinally along its axis while the outer cylindrical band remains fixed in place.

From the foregoing it can be seen that a transversely restrained, 18 longitudinally flexible mount for use in mounting a bearing for a spindle in a spindle housing has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A radially restrained, longitudinally flexible mount for use in mounting a bearing for a rotating shaft in a frame, said radially restrained, longitudinally flexible mount comprising:
   a. an inner ring which is mechanically coupled to the bearing;
   b. an outer ring which is disposed concentricly to said inner ring and which is mechanically coupled to the frame;
   c. a frame member which has an inner cylindrical band which is mechanically coupled to said inner ring and an outer cylindrical band which is mechanically coupled to said outer ring;
   d. a first flexible coupling member which longitudinally flexibly couples said inner cylindrical band to said outer cylindrical band whereby said inner ring can bidirectionally move longitudinally along the axis of the shaft;
   e. a second flexible coupling member which longitudinally flexibly couples said inner cylindrical band to said outer cylindrical band whereby said inner ring can bidirectionally move longitudinally along the axis of the shaft; and
   f. a plurality of spokes which provide lateral rigidity between said inner cylindrical band and said outer cylindrical band so that said inner cylindrical band and said outer cylindrical band are concentric with each other and the axis of the shaft.

* * * * *